United States Patent [19]

Benham et al.

[11] Patent Number: 5,344,884
[45] Date of Patent: Sep. 6, 1994

[54] POLYETHYLENE BLENDS

[75] Inventors: Elizabeth A. Benham; Max P. McDaniel, both of Bartlesville, Okla.

[73] Assignee: Phillips Petroleum Company, Bartlesville, Okla.

[21] Appl. No.: 963,294

[22] Filed: Oct. 8, 1992

[51] Int. Cl.⁵ .............. C08L 23/08; C08L 23/06; C08L 31/04
[52] U.S. Cl. ..................... 525/222; 525/240
[58] Field of Search .......................... 525/222

[56] References Cited

U.S. PATENT DOCUMENTS

| | | | |
|---|---|---|---|
| 4,053,436 | 10/1977 | Hogan et al. | 526/106 |
| 4,219,444 | 8/1980 | Hill et al. | 526/106 |
| 4,345,055 | 8/1982 | Hawley | 526/106 |
| 4,410,649 | 10/1983 | Cieloszyk | 524/108 |
| 4,425,268 | 1/1984 | Cooper | 524/110 |
| 4,436,788 | 3/1984 | Cooper | 428/483 |
| 4,457,960 | 7/1984 | Newsome | 428/35 |
| 4,503,102 | 3/1985 | Mollison | 428/35 |
| 4,504,434 | 3/1985 | Cooper | 264/22 |
| 4,587,303 | 5/1986 | Turtle | 525/240 |
| 4,614,764 | 9/1986 | Colombo et al. | 525/72 |
| 4,617,241 | 10/1986 | Mueller | 428/520 |
| 4,734,327 | 3/1988 | Vicik | 428/332 |
| 4,760,116 | 7/1988 | Roberts | 525/221 |
| 4,774,277 | 9/1988 | Janac et al. | 525/222 |
| 4,814,135 | 3/1989 | Heitz | 526/348.1 |
| 4,877,663 | 10/1989 | Kambe et al. | 525/222 |
| 4,957,974 | 9/1990 | Ilenda et al. | 525/301 |
| 4,981,760 | 1/1991 | Naito et al. | 428/523 |
| 5,000,992 | 3/1991 | Kelch | 428/36.5 |
| 5,006,398 | 4/1991 | Banerji | 428/220 |
| 5,073,598 | 12/1991 | Anzini | 525/193 |
| 5,091,241 | 2/1992 | Lang et al. | 428/213 |
| 5,112,674 | 5/1992 | German et al. | 428/216 |
| 5,112,696 | 5/1992 | Roberts | 525/222 |

Primary Examiner—Carman J. Seccuro, Jr.
Attorney, Agent, or Firm—Carl D. Corvin

[57] ABSTRACT

A blended polymer composition that comprises: (a) from about 10 weight percent to about 40 weight percent of an ethylene-vinyl acetate copolymer resin; and (b) from about 60 weight percent to about 90 weight percent of a linear ethylene copolymer resin; wherein said weight percents are based on the weight of said polymer composition.

A blended polymer composition that comprises: (a) from about 10 weight percent to about 40 weight percent of an ethylene-vinyl acetate copolymer resin; (b) from about 5 weight percent to about 25 weight percent of a branched ethylene homopolymer resin; (c) from about 50 weight percent to about 85 weight percent of a linear ethylene copolymer resin; wherein said weight percents are based on the weight of said polymer composition.

23 Claims, No Drawings

POLYETHYLENE BLENDS

BACKGROUND OF THE INVENTION

This invention relates to the field of polyethylene blends.

Polyethylene is known as a general purpose thermoplastic. Billions of pounds of polyethylene are produced each year. Polyethylene is produced in two main processes. The first process is the high pressure, free radical, polymerization process. The second process is the low pressure, transition metal, polymerization process.

The high pressure, free radical, polymerization process produces a polyethylene resin that has, in general, low haze values and moderate strength values when used in film applications. This type of polyethylene resin tends to have several short and long chain branches, hence the reason it is recognized in the art as "branched polyethylene" or "low density polyethylene".

One particular subcategory of branched polyethylene is branched ethylene copolymers. In particular, branched ethylene copolymers having vinyl acetate ($CH_3COOOCH=CH_2$) as a comonomer are especially interesting. One of the interesting properties of these ethylene-vinyl acetate copolymers is that they tend to have very low crystallinity but not a correspondingly low density. This is partly because the vinyl acetate groups in the copolymer tend to increase the density of the amorphous regions of the copolymer. This, therefore, provides a means of lowering the crystallinity of a polymer composition without necessarily lowering the density of this polymer composition by a corresponding amount.

The low pressure, transition metal, polymerization process produces a polyethylene resin that has, in general, high haze values and high strength values when used in film applications. This type of polyethylene resin tends to have a few short chain branches and essentially no long chain branches, hence the reason it is recognized in the art as "linear polyethylene" or "linear low density polyethylene".

It is desirable for a polyethylene film to possess high impact strength, high tear strength, and low haze. This is because a polyethylene film with better properties can use less polyethylene resin to accomplish a given task. For example, a polyethylene grocery sack that uses less polyethylene resin because it has better properties is more environmentally friendly than a polyethylene grocery sack that uses more polyethylene resin because its properties are not as good.

High impact strength is desirable because a polyethylene film with high impact strength is able to resist rupturing better than a polyethylene film with low impact strength, other facts being equal. High impact strength is especially desirable in polyethylene grocery sacks where higher impact strength can lead to a sack that uses less polyethylene resin.

High tear resistance is also desirable because a polyethylene film with high tear strength is able to resist tearing better than a polyethylene film with low tear strength, other facts being equal. High tear strength is also especially desirable in polyethylene grocery sacks where a tear can lead to the catastrophic failure of the sack.

Low haze is desirable because a polyethylene film with low haze is easier to see through than a polyethylene film with high haze. Low haze is especially desirable in applications like bread packaging where a consumer wishes to look at the product before buying the product.

It is difficult, however, to produce a polyethylene film that has high impact strength, high tear strength, and low haze. This is because there are several competing factors that affect these properties. For example, increasing the density of a polyethylene resin increases the haze of the resin (which is not desirable) and it also decreases the impact strength of the resin (which is not desirable) other factors being equal.

As another example, increasing the molecular weight of a polyethylene resin increases both the tear strength and the impact strength of the resin (which is desirable) but it also increases the haze of the resin (which is not desirable) other factors being equal.

As another example, broadening the molecular weight distribution (as hereafter defined) of a polyethylene resin increases the processability of the resin (which is desirable) but it also increases the haze of the resin (which is not desirable) other factors being equal. Easy processability is desired because it allows a polyethylene producer to process more polyethylene resin through his polyethylene equipment without degrading the resin, other factors being equal.

This invention provides an improved polyethylene composition having a desirable combination of properties.

SUMMARY OF THE INVENTION

It is an object of this invention to provide blended polymer compositions.

It is another object of this invention to provide blended polymer compositions having decreased haze.

It is another object of this invention to provide blended polymer compositions having decreased haze and improved tear strength.

In accordance with an embodiment of this invention blended polymer compositions are provided. These blended polymer compositions comprise (or optionally consist essentially of, or consist of):

(1) from about 10 weight percent to about 40 weight percent of an ethylene-vinyl acetate copolymer resin, wherein said resin is produced by the high pressure, free radical, polymerization process, and wherein said resin has a density from about 0.92 to about 0.945 grams per cubic centimeter, and wherein said resin has a melt index less than 6 grams per 10 minutes; and (2) from about 60 weight percent to about 90 weight percent of a linear ethylene copolymer resin, wherein said resin is produced by the low pressure, chromium catalyzed, slurry polymerization process, and wherein said resin has a density from about 0.91 to about 0.94 grams per cubic centimeter, and wherein said resin has a melt index less than about 0.3 grams per 10 minutes, and wherein said resin has a shear ratio greater than about 70, and wherein said resin has a heterogeneity index greater than about 10; and wherein said weight percents are based on the weight of said polymer composition.

In accordance with another embodiment of this invention blended polymer compositions are provided. These blended polymer compositions comprise (or optionally consist essentially of, or consist of):

(1) from about 10 weight percent to about 40 weight percent of an ethylene-vinyl acetate copolymer resin, wherein said resin is produced by the high pressure, free radical, polymerization process, and wherein said resin has a density from about 0.92 to about 0.945 grams per cubic centimeter, and wherein said resin has a melt index less than 6 grams per 10 minutes; and (2) from about 5 weight percent to about 25 weight percent of a branched ethylene homopolymer resin, wherein said resin is produced by time high pressure, free radical, polymerization process, and wherein said resin has a density from about 0.91 to about 0.93 grams per cubic centimeter, and wherein said resin has a melt index less than 6 grams per 10 minutes; and (3) from about 55 weight percent to about 85 weight percent of a linear ethylene copolymer resin, wherein said resin is produced by the low pressure, chromium catalyzed, slurry polymerization process, and wherein said resin has a density from about 0.91 to about 0.94 grams per cubic centimeter, and wherein said resin has a melt index less than about 0.3 grams per 10 minutes, and wherein said resin has a shear ratio greater than about 70, and wherein said resin has a heterogeneity index greater than about 10; and wherein said weight percents are based on the weight of said polymer composition.

DETAILED DESCRIPTION OF THE INVENTION

The branched polyethylene resins used in this invention are prepared by the high pressure, free radical, polymerization process. This process is known in the art. For example, it uses oxygen, peroxides, and/or other strong oxidizers as a catalyst. Typical pressures are from about 100 to about 350 MPa and typical temperatures are from about 130° C. to about 350° C. This process produces polyethylene resins that are highly branched with short side chains occurring about every 15 to 40 carbon atoms in the chain backbone, hence the art given name of "branched polyethylene." Examples of high pressure, free radical, polymerization processes can be found in U.S. Pat. Nos. 2,953,551; 2,979,496; 3,293,233; 3,350,372; 3,628,918; 3,725,378; 3,780,140; 3,842,060; 4,135,044; the entire disclosures of which are hereby incorporated by reference.

The amount of ethylene vinyl acetate copolymer resin to use in the polymer composition of this invention is from about 10 weight percent to about 40 weight percent; it is preferred, however, that the amount be from about 15 weight percent to about 35 weight percent; and it is most preferred that the amount be from 20 weight percent to 30 weight percent; wherein said weight percents are based on the weight of the polymer composition. This is because if less than about 10 weight percent of ethylene-vinyl acetate copolymer is blended with the polymer composition, the polymer composition could be lacking in certain properties like clarity and density; and if more than about 40 weight percent of ethylene-vinyl acetate copolymer is blended with the polymer composition, the composition could be lacking in certain properties like tackiness.

The ethylene-vinyl acetate copolymer resins used in the polymer composition of this invention have from about 5 weight percent to about 25 weight percent vinyl acetate groups in their copolymer structure. It is preferred for the copolymers to have more than 10 weight percent but less than 20 weight percent vinyl acetate groups in their copolymer structure. This is because ethylene-vinyl acetate copolymer resins tend to have less flexibility, puncture resistance, and impact strength below about 5 weight percent vinyl acetate; however, they tend to become almost rubbery above about 25 weight percent vinyl acetate.

The ethylene-vinyl acetate copolymer should have a density from about 0.92 to about 0.945 grams per cubic centimeter. Additionally, the ethylene-vinyl acetate copolymer should have a melt index less than 6 grams per 10 minutes, as measured by ASTM-D-1238 at 190° C. and with a 2.16 kg weight. However, it is more preferred that the melt index be from 0.3 to 1 gram per 10 minutes due to such performance factors as impact strength.

The amount of branched ethylene homopolymer resin to use in one embodiment of the invention is from about 5 weight percent to about 25 weight percent wherein the weight percent is based on the weight of the polymer composition, However, it is preferred that the amount used be from 10 weight percent to 20 weight percent.

The branched ethylene homopolymer resin should have a density from about 0.91 to about 0.93 grams per cubic centimeter. However, it is preferred that the density be from about 0.9 13 to about 0.93 grams per cubic centimeter; it is more preferred that the density be from about 0.916 to about 0.93 grams per cubic centimeter; and it is most preferred that the density be greater than 0.918 but less than 0.93 grams per cubic centimeter. The density can be determined using ASTM-D- 1505.

The branched ethylene homopolymer resin should have a melt index less than 6 grams per 10 minutes, as measured by ASTM-D-1238 at 190° C. and with a 2.16 kg weight. However, it is preferred that the melt index be from about 0.1 to about 5 grams per 10 minutes; it is more preferred that the melt index be from about 0.1 to about 1 grams per 10 minutes; and it is most preferred that the melt index be from 0.2 to 0.8 grams per 10 minutes.

The linear ethylene copolymer resin is prepared by the low pressure, chromium-catalyzed, slurry polymerization process. This resin is more linear in nature, that is, it has little or no long chain branching. Examples of preferred chromium catalysts and/or slurry polymerization processes can be found in U. S. Pat. Nos. 3,887,494; 3,900,457; 3,947,433; 4,053,436; 4,081,407; 4,151,122; 4,294,724; 4,296,001; 4,345,055; 4,364,839; 4,364,841; 4,364,842; 4,364,854; 4,364,855; 4,392,990; 4,397,765; 4,402,864; 4,405,501; the entire disclosures of which are hereby incorporated by reference.

The amount of linear ethylene copolymer resin to use in one embodiment of the invention is from about 60 to about 90 weight percent wherein the weight percent is based on the weight of the polymer composition. However, it is preferred that the weight percent be from 70 to 80 weight percent. In another embodiment of the invention the amount of linear ethylene copolymer resin to use is from about 55 to about 85 weight percent wherein the weight percent is based on the weight of the polymer composition. However, it is preferred that the weight percent be from 65 to 75 weight percent.

The linear ethylene copolymer resin should have a density from about 0.91 to about 0.94 grams per cubic centimeter. However, it is preferred that the density be from about 0.913 to about 0.937 grams per cubic centimeter; it is more preferred that the density be from about 0.916 to about 0.933 grams per cubic centimeter;

and it is most preferred that the density be from 0.92 to 0.93 grams per cubic centimeter. The density can be determined using ASTM-D-1505.

The linear ethylene copolymer resin should have a melt index less than 0.3 grams per 10 minutes, as measured by ASTM-D-1238 at 190° C. and with a 2.16 kg weight. However, it is preferred that the melt index be from 0.1 to 0.3 grams per 10 minutes.

The sheer ratio is defined for the purposes of this specification as the ratio of the high load melt index, as determined by ASTM-D-1238 at a temperature of 190° C. with a 21.60 kg weight, to the melt index, as determined by ASTM-D-1238 at a temperature of 190° C. with a 2.16 kg weight. The linear ethylene copolymer resin should have a shear ratio greater than about 70. However, it is preferred that the shear ratio be from about 70 to about 150; it is more preferred, however, that the shear ratio be from about 80 to about 135; and it is most preferred that the shear ratio be from 90 to 120.

The heterogeneity index is defined for the purposes of this specification as the ratio of the weight average molecular weight to the number average molecular weight, wherein both molecular weights are determined by using data collected from gel permeation chromatography. The gel permeation chromatography used in this specification was accomplished with a Waters 150C chromatograph operated at 140° C. with 1,2,4-trichlorobenzene used as the carrier solvent. The linear ethylene copolymer resin should have a heterogeneity index greater than about 10. However, it is more preferred that the heterogeneity index be from about 10 to about 40; it is more preferred that the heterogeneity index be from about 12 to about 32; and it is most preferred that the heterogeneity index be from 15 to 25.

The blending of these resins can be accomplished by any method known in the art which produces a blend from two or more polymer resins. Standard polymer processing equipment can be used to make these blends such as, for example, single-screw extruders, twin-screw extruders, and continuous mixers. Additionally, during blending (or optionally during making the polymer) other components can be added to the blend. These components can be antioxidants, UV stabilizers, preservatives, processing aids, fluorelastomers, slip agents, antiblocking agents, antistatic agents, pigments, flame retardants, cross linking adjuvants, and blowing agents.

EXAMPLES

These examples are provided to illustrate the invention. The particular reactants, conditions, properties, and the like, are intended to be generally illustrative of this invention and are not meant to be construed as unduly limiting the reasonable scope of this invention.

Examples I

The branched ethylene homopolymer resin used in this example was acquired from the U.S. Industrial Chemicals Company. This branched ethylene homopolymer resin was produced using the high pressure, free radical, polymerization process. The linear ethylene copolymer resin used in this example was from the Daelim Corporation. It was produced using the low pressure, chromium catalyzed, slurry polymerization process.

These two resins were blown into 1 mil films and tested for their properties. All films used in this example were produced with a two inch Sano die. Line conditions were a 4:1 blow-up ratio, a 220° C.–240° C. die temperature, a take up speed of 30–70 ft/min., and a 14″ frost line.

TABLE E1

Selected Properties of the Branched and Linear Polyethylene Resin

| Characteristic | Branched | Linear |
|---|---|---|
| Dart Drop[1] | 163 | 330 |
| Tear, MD[2] | 124 | 98 |
| Tear, TD[2] | 204 | 690 |
| Melt Index[3] | 2.6 | — |
| High Load Melt Index[3] | — | 17.4 |
| Density[4] | 0.921 | 0.929 |
| Haze[5] | 10 | 55 |

[1]The dart drop impact was determined in accordance with ASTM-D-1709. This is a standard test method for determining the impact resistance of polyethylene film. This is reported in grams.
[2]The tear resistance was determined in accordance with ASTM-D-1922. This is a standard test method for determining the propagation tear resistance of a plastic film. "MD" means machine direction, "TD" means transverse direction. This is reported in grams.
[3]The melt index and the high load melt index were determined in accordance with ASTM-D-1238. The melt index was determined at FR-190/2.16 and the high load melt index was determined at FR-190/21.60. This is reported in grams per 10 minutes.
[4]The density was determined in accordance with ASTM-D-1505. This is reported in grams per cubic centimeter.
[5]The haze was determined by using a Gardner XL-211 hazeguard/hazemeter system. This device uses a procedure similar to ASTM-D-1003.
"—" means not determined.

As can be seen from Table E1, time linear resin has a much better dart drop value, a much better tear TD value, but a lower tear MD value, and a higher haze value.

These above resins were then blended and selected properties were determined. The results are presented in Table E2.

TABLE E2

Selected Properties of the Blended Polyethylene Resins

| | Weight Percents | |
|---|---|---|
| Characteristic | Linear 90% Branch 10% | Linear 80% Branch 20% |
| Dart Drop[1] | 270 | 175 |
| Tear, MD[2] | 130 | 120 |
| Tear, TD[2] | 740 | 650 |
| Haze[3] | 31 | 18 |

[1]See Note 1, Table E1.
[2]See Note 2, Table E1.
[3]See Note 5, Table E1.

Comparing Table E2 to E1 the values for the tear resistance and the haze were greatly improved. However, this was not without a price because the dart drop was reduced.

Using the rule of mixtures the tear MD should have been close to 101 grams for the 90-10 mixture. Therefore, the actual value of 130 represents a twenty-nine percent improvement over the expected value. Similarly the tear TD should have been close to 641 grams. Therefore, the actual value of 740 represents a fifteen percent improvement over the expected value. Also, the haze value should have been close to fifty-one percent. Therefore, the actual value of 31 percent represents a 65 percent improvement over the expected value.

Similarly, the tear MD should have been close to 103 for the 80-20 mixture. Therefore, the actual value of 120 grams represents a seventeen percent improvement over tile expected value. Similarly, the tear TD should have been close to 593 grams. Therefore, the actual value of 650 grams represents a ten percent improvement over the expected result. Also, the haze should have been close to 46 percent. Therefore, the actual value of 18 percent represents a 61 percent improvement over the expected value.

However, a cost was also observed. The dart drop of the 90-10 mixture should have been close to 313 grams. Therefore, the actual value of 270 grams represents a fourteen percent reduction in the expected value. Similarly, for the 80-20 mixture the dart drop should have been 297 grams. Therefore, the actual value of 173 grams represents a forty-two percent reduction in the expected value.

Example II

The ethylene-vinyl acetate copolymer resin used in this example was acquired through the Daelim Corporation, which is a licensee of the Phillips Petroleum Company. This resin was produced using the high pressure, free radical, polymerization process. This resin contains 15 weight percent vinyl acetate and 85 weight percent ethylene. The linear ethylene copolymer resin used in this example was also obtained from the Daelim Corporation. This resin was produced using the low pressure, chromium-catalyzed, slurry polymerization process. This linear resin had a haze value of 62%. These resins were blended and blown into 1 mil films as above in Example I. The results are presented in Table E3.

TABLE E3

|  | Linear 80% EVA 20% | Linear 70% EVA 30% |
| --- | --- | --- |
| Haze[1] | 18 | 17 |

[1]See Note 5, Table E1.

As can be seen from Table E3, the haze of the linear resin dropped from 62% to 18% when 20 weight percent of ethylene-vinyl acetate polymer was blended with the linear resin.

Consequently, as can be seen from Example I and II, a resin could be produced having a linear ethylene copolymer component, an ethylene-vinyl acetate component, and a branched ethylene homopolymer component.

That which is claimed is:

1. A blended polymer composition that comprises:
   (a) from about 10 weight percent to about 40 weight percent of an ethylene-vinyl acetate copolymer resin, wherein said resin is produced by the high pressure, free radical, polymerization process, and wherein said resin has a density from about 0.92 to about 0.945 grams per cubic centimeter, and wherein said resin has a melt index less than 6 grams per 10 minutes;
   (b) from about 5 weight percent to about 25 weight percent of a branched ethylene homopolymer resin, wherein said resin is produced by the high pressure, free radical, polymerization process, and wherein said resin has a density from about 0.91 to about 0.93 grams per cubic centimeter, and wherein said resin has a melt index from about 0.1 to about 1 gram per 10 minutes; and
   (c) from about 55 weight percent to about 85 weight percent of a linear ethylene copolymer resin, wherein said resin is produced by the low pressure, chromium catalyzed, slurry polymerization process, and wherein said resin has a density from about 0.91 to about 0.94 grams per cubic centimeter, and wherein said resin has a melt index less than 0.3 grams per 10 minutes, and wherein said resin has a shear ratio greater than about 70, and wherein said resin has a heterogeneity index greater than 15;

wherein said weight percents are based on the weight of said polymer composition.

2. A blended polymer composition according to claim 1 wherein the amount of said ethylene-vinyl acetate copolymer resin is from about 15 weight percent to about 35 weight percent.

3. A blended polymer composition according to claim 1 wherein the amount of said ethylene-vinyl acetate copolymer resin is from 20 weight percent to 30 weight percent.

4. A blended polymer composition according to claim 1 wherein said ethylene-vinyl acetate copolymer resin comprises about 5 weight percent to about 25 weight percent vinyl acetate groups.

5. A blended polymer composition according to claim 1 wherein said ethylene-vinyl acetate copolymer resin comprises 10 weight percent to 20 weight percent vinyl acetate groups.

6. A blended polymer composition according to claim 1 wherein said ethylene-vinyl acetate copolymer resin has a melt index from 0.3 to 1 grams per 10 minutes.

7. A blended polymer composition according to claim 1 wherein the amount of said branched ethylene homopolymer resin is from 10 weight percent to 20 weight percent.

8. A blended polymer composition according to claim 1 wherein said branched ethylene homopolymer resin has a density from about 0.913 to about 0.93 grams per cubic centimeter.

9. A blended polymer composition according to claim 1 wherein said branched ethylene homopolymer resin has a density from about 0.916 to about 0.93 grams per cubic centimeter.

10. A blended polymer composition according to claim 1 wherein said branched ethylene homopolymer resin has a density from 0.918 to 0.93 grams per cubic centimeter.

11. A blended polymer composition according to claim 1 wherein said branched ethylene homopolymer resin has a melt index from 0.2 to 0.8 grams per 10 minutes.

12. A blended polymer composition according to claim 1 wherein the amount of said linear ethylene copolymer resin is from 70 weight percent to 80 weight percent.

13. A blended polymer composition according to claim 1 wherein said linear ethylene copolymer resin has a density from about 0.913 to about 0.937 grams per cubic centimeter.

14. A blended polymer composition according to claim 1 wherein said linear ethylene copolymer resin has a density from about 0.916 to about 0.933 grams per cubic centimeter.

15. A blended polymer composition according to claim 1 wherein said linear ethylene copolymer resin has a density from 0.92 to 0.93 grams per cubic centimeter.

16. A blended polymer composition according to claim 1 wherein said linear ethylene copolymer resin has a melt index greater than 0.1 but less than 0.3 grams per 10 minutes.

17. A blended polymer composition according to claim 1 wherein said linear ethylene copolymer resin has a shear ratio from about 70 to about 150.

18. A blended polymer composition according to claim 1 wherein said linear ethylene copolymer resin has a shear ratio from about 80 to about 135.

19. A blended polymer composition according to claim 1 wherein said linear ethylene copolymer resin has a shear ratio from 90 to about 120.

20. A blended polymer composition according to claim 1 wherein said linear ethylene copolymer resin has a heterogeneity index from 15 to about 40.

21. A blended polymer composition according to claim 1 wherein said linear ethylene copolymer resin has a heterogeneity index from 15 to about 32.

22. A blended polymer composition according to claim 1 wherein said linear ethylene copolymer resin has a heterogeneity index from 15 to 25.

23. A blended polymer composition that comprises:
 (a) from 20 weight percent to 30 weight percent of an ethylene-vinyl acetate copolymer resin, wherein said resin is produced by the high pressure, free radical, polymerization process, and wherein said resin has a density from about 0.92 to about 0.945 grams per cubic centimeter, and wherein said resin has a melt index from 0.3 to 1 gram per 10 minutes;
 (b) from 10 weight percent to 20 weight percent of a branched ethylene homopolymer resin, wherein said resin is produced by the high pressure, free radical, polymerization process, and wherein said resin has a density from 0.918 to 0.93 grams per cubic centimeter, and wherein said resin has a melt index from 0.2 to 0.8 grams per 10 minutes; and
 (c) from about 60 weight percent to about 70 weight percent of a linear ethylene copolymer resin, wherein said resin is produced by the low pressure, chromium catalyzed, slurry polymerization process, and wherein said resin has a density from 0.92 to 0.93 grams per cubic centimeter, and wherein said resin has a melt index from 0.1 to 0.3 grams per 10 minutes, and wherein said resin has a shear ratio from 90 to 120, and wherein said resin has a heterogeneity index from 15 to 25;
wherein said weight percents are based on the weight of said polymer composition.

* * * * *